J. F. O'CONNOR.
HAND BRAKE.
APPLICATION FILED JAN. 14, 1921.
1,405,621.
Patented Feb. 7, 1922.
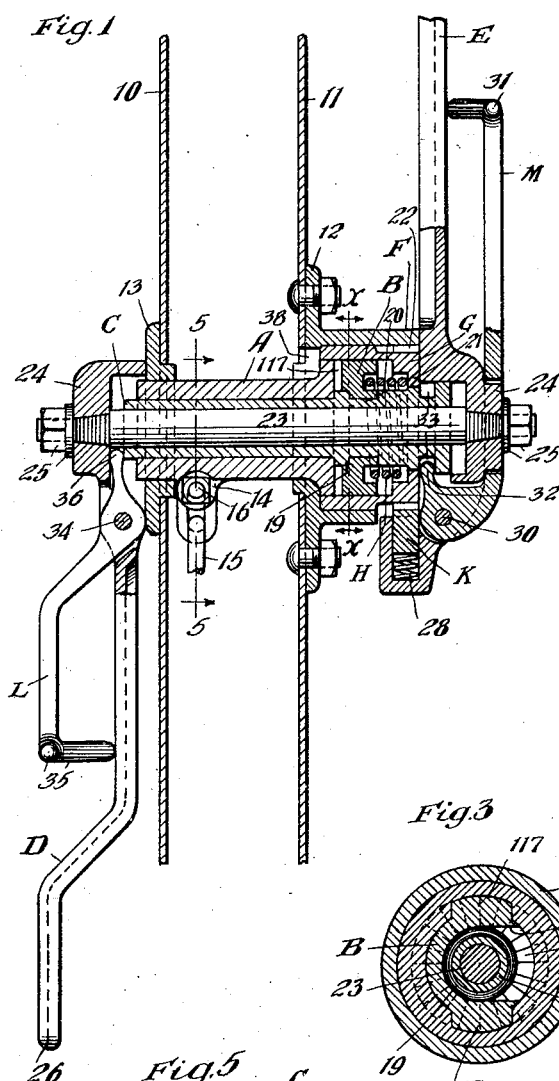
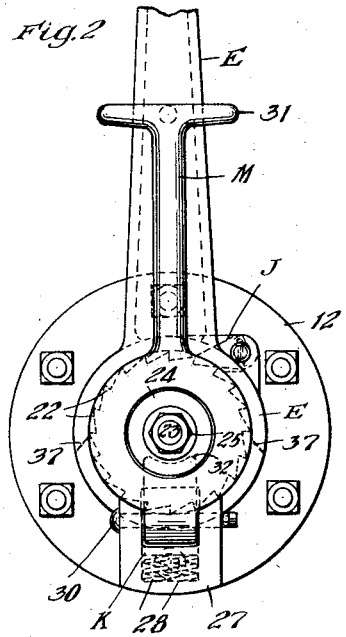
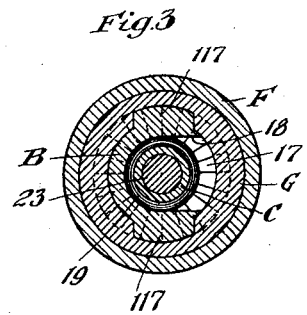
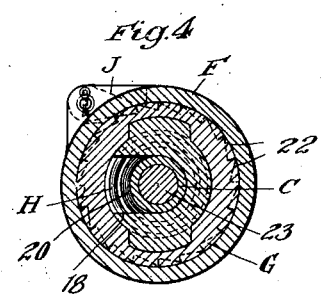
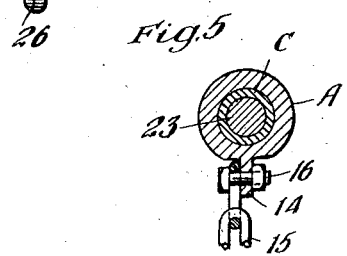
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND BRAKE.

1,405,621.            Specification of Letters Patent.      Patented Feb. 7, 1922.

Application filed January 14, 1921. Serial No. 437,260.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

One object of the invention is to provide a simple and efficient hand brake, especially adapted for railway cars, such as a mail car, and wherein the device is operable both to apply the brake and release the same, from either side of a car wall.

A more specific object of the invention is to provide a hand brake of the character above indicated wherein only one set of ratcheting devices is employed but in which the release thereof may be effected with equal facility from either side of the wall.

In the drawing forming a part of this specification, Figure 1 is a vertical, sectional view showing a portion of a car wall with my improved brake applied thereto. Figure 2 is an elevational view of the brake shown in Figure 1 and taken from the righthand side looking toward the left thereof. Figures 3 and 4 are vertical, sectional views taken on the section line $x$—$x$ of Figure 1, Figure 3 looking in the direction toward the left and Figure 4 in the direction toward the right. And Figure 5 is a detail, sectional view corresponding substantially to the line 5—5 of Figure 1.

In said drawing, the wall of the car is shown as comprised of an outer sheet metal sheathing 10 and an inner sheet metal sheathing 11 spaced therefrom an appreciable distance as is customary in mail cars. The improved brake is extended in part through the wall and operable from both sides thereof.

As shown, the brake comprises, broadly, a chain winding drum A; a pawl ratchet wheel B; a bushing or sleeve C; an outer operating handle or lever D; an inner operating handle or lever E; a casing F; a bushing G; a spring H; a locking dog J; a ratcheting pawl K; an outer release lever L; and an inner release lever M.

The casing F is of substantially hollow cylindrical form having a suitable annular flange 12 by which it is bolted or otherwise rigidly secured to the inner sheathing 11 of the car wall. Said casing forms a bearing for the bushing G and also for one end of the drum A. A reinforcing and bearing plate 13 is secured to the outer wall 10, the same having a central opening forming the bearing for the drum A.

The drum A is of cylindrical form and is provided with a radially extending flange 14 by which the upper end of the chain 15 may be attached through the intermediary of a bolt 16. As will be understood by those skilled in the art, upon rotation of the drum A, the chain will wind therearound, thereby pulling the brake rod and causing application of the brakes to the car wheels. The chain extends down through the wall and over a sheave wheel, not shown. At its inner end, the drum A is formed with a ratchet wheel having a series of radially arranged ratchet teeth 17. The pawl B is formed on its side adjacent the drum ratchet wheel with two diametrically opposed sets of co-operating radially arranged ratchet teeth 117. The flanged inner end of the drum A upon which the ratchet teeth 17 are formed, has a circular periphery as indicated in Figure 3, thereby adapting the drum to rotate with respect to the sleeve G.

The pawl B is of the cross section best shown in Figure 3 where it will be seen that it is open to one side as indicated at 18, thereby adapting said pawl member B to be slid over the sleeve C which is shouldered on opposite sides of the pawl as indicated at 19 and 20. In this manner, the pawl is prevented from longitudinal movement with respect to the sleeve C but may be readily assembled therewith. The spring H reacts against one side of the pawl B and at its opposite end against an inwardly extending flange 21 formed at the outer end of the sleeve G so that said spring H normally holds the pawl B in operative engagement with the drum A and the bushing C toward the left, as viewed in Figure 1. As clearly shown in Figures 3 and 4, the cross section of the pawl B is such that it cannot rotate with respect to the sleeve G although it is permitted an axial movement with respect thereto for a limited distance and against the action of the spring H.

The sleeve G is rotatably mounted within the casing F and at its outer end is provided with a series of peripheral ratchet teeth 22 with which is adapted to cooperate the pivoted gravity-influenced locking dog J, as best shown in Figures 2 and 4. The dog J prevents accidental reverse rotation of the sleeve G and consequently of the drum A.

Extending through the center of the bushing C is a rod or axle 23 having tapered non-circular ends on which are seated the correspondingly recessed hubs 24—24 of the two levers D and E. The latter are secured to the rod 23 by suitable washers and nuts as indicated at 25—25. The levers D and E may be of any suitable construction, the lever D preferably having its hand grip 26 outwardly offset from the wall as shown in Figure 1. On account of the fact that the lever E is farther removed from the inside of the wall, such an offset is not necessary. In the case of the lever E, it is provided with a depending rectangular enlargement 27 which is suitably recessed to accommodate a spring 28 and a sliding spring controlled pawl K in the plane of the ratchet teeth 22 with which it is adapted to cooperate in the usual manner. The release lever M is pivotally attached to the operating lever G, as by the pivot pin 30, said release lever M extending normally parallel to the lever E and having a suitable hand grip 31 at its upper end by which it is maintained spaced from the lever E and readily accessible for operation. At its lower end, above the pivot pin 30, the release lever M is formed with a rounded rib 32 which engages in an annular groove 33 formed in the sleeve C. As will be evident, upon pulling the release lever M outwardly or away from its operating lever E, the sleeve C will be moved axially toward the right, thereby carrying with it the pawl B and disengaging the latter from the drum A so that the drum is then free to rotate in an unwinding direction to release the brake chain.

The release lever L is pivotally attached to its corresponding operating lever D as by a pivot pin 34. Said release lever L has a similar hand grip 35 to space it from the lever D. At its upper end, the release lever L is formed with a small arm 36 which engages between the adjacent end of the sleeve C and the hub 24. By pulling the release lever L outwardly away from its lever D, it is evident that the sleeve C will be forced to the right against the action of the spring H, thereby disengaging the pawl B from the drum A and adapting the latter to rotate in an unwinding direction to release the brake chain.

To operate the device to wind the chain or tighten it, either handle D or E may be utilized to impart a clockwise rotation to the drum, as viewed in Figure 2. Release may be effected by either of the release levers L or M as hereinbefore described. Preferably, the casing F has beveled shoulders 37—37 on opposite sides as indicated in Figure 2 to limit the rotative movement of the operating levers as it is desirable to prevent the levers from swinging too far to either side of vertical position. In this connection, it will be noted that the outside lever D is normally dependent and the lever E normally extended upwardly. This is done for the reason that, on the outside of the car, the brakeman is generally required to work from a step which is comparatively low and must pull up on the operating lever whereas, on the interior of the car, the operator stands upon the floor and pulls the inside lever downwardly toward him. In order to maintain the vertical positions of the levers as above described, they are oppositely disposed as shown and in addition the enlargement 27 is preferably made comparatively heavy so as to act as a counterweight in assisting to maintain the vertical positions of the operating levers.

In assembling my brake, after the casing F and casting 13 are in position, the end of the brake chain is brought out through the casing F and secured to the drum, the parts then being inserted within the casing to their final proper positions. To permit of this, the casing F may be slotted as indicated at 58 to provide the necessary clearance for the chain and flange 14 when the drum is inserted through the casing.

From the preceding description, it will be seen that I employ only one set of ratcheting devices proper, thereby reducing the cost of manufacture and application while at the same time providing for operation and release with equal facility from either side of the wall.

I have herein shown and described what I now consider the preferred manner of carrying out the invention, but the same is merely illustrative and I contemplate all changes and modifications that come within the scope of the claims appended hereto.

I claim:

1. In a hand brake, the combination with a rotatable element; of a ratchet wheel rigid with said element; a pawl cooperable with said ratchet wheel, the pawl being axially movable relative to the ratchet wheel to permit disengagement therefrom; spring means yieldingly impelling said pawl into cooperative engagement with said ratchet wheel; a locking dog; a second ratchet wheel with which said dog cooperates, said pawl being non-rotatable but axially movable with respect to said second named ratchet wheel; an operating lever and pawl for effecting step by step rotation of said second named ratchet wheel; and a release member for moving said pawl axially against the spring action to thereby release said rotatable element.

2. In a hand brake, the combination with a rotatable element; of a ratchet wheel rigid with said element; a pawl cooperable with said ratchet wheel, the pawl being axially movable relative to the ratchet wheel to permit disengagement therefrom; spring means yieldingly impelling said pawl into cooperative engagement with said ratchet wheel; a locking dog; a second ratchet wheel with which said dog cooperates, said pawl being non-rotatable but axially movable with respect to said second named ratchet wheel; an operating lever and pawl for effecting step by step rotation of said second named ratchet wheel, and a release member for moving said pawl axially against the spring action to thereby release said rotatable element, said release member comprising a lever pivotally mounted on said operating lever.

3. In a hand brake, the combination with a casing adapted to be secured to a wall of a car or the like; of a sleeve rotatably mounted within said casing and having a ratchet wheel; of a locking dog cooperable with said ratchet wheel to prevent rotation of said sleeve in an unwinding direction; an operating lever and pawl oscillatably mounted with respect to and cooperable with the ratchet wheel of said sleeve; a rotatable chain-tightening element rotatably mounted with respect to said sleeve and having a ratchet wheel; a pawl cooperable with said last named ratchet wheel, said pawl being axially but non-rotatably mounted within said sleeve; a spring normally maintaining said last named pawl in cooperative engagement with the ratchet wheel of said element; and means for effecting axial movement of said pawl with respect to said sleeve to thereby release said rotatable element.

4. In a hand brake operable from both sides of a wall, the combination with a rotatable element having a ratchet wheel rigid therewith; of a spring-influenced pawl cooperable with said ratchet wheel and movable axially relatively thereto; an operating member on each side of the wall; means interposed between said operating members and said pawl for effecting step by step rotation thereof; and means, including a relase element on each side of the wall, for effecting axial movement of said pawl to disengage it from said ratchet wheel.

5. In a hand brake operable from both sides of a wall, the combination with a rotatable drum having a ratchet wheel rigid therewith; of a pawl cooperable with said ratchet wheel and adapted for axial movement with respect thereto; a spring normally maintaining said pawl in cooperative engagement with said ratchet wheel; a second ratchet wheel non-rotatably engaged with said pawl but with respect to which the latter is axially movable; a locking dog cooperable with said second named ratchet wheel; an operating lever and pawl cooperable with said second named ratchet wheel to effect step by step rotation thereof, said lever being disposed on one side of the wall; a second operating lever on the opposite side of the wall; means extending between said levers rigidly connecting the same; a release lever pivotally mounted on each operating lever; and axially movable means common to said first named pawl and the two release levers adapted to be axially moved to disengage said first named pawl upon actuation of either release lever.

6. In a hand brake operable from both sides of a wall, the combination with a winding drum rotatably mounted within the wall and having a ratchet wheel at one end thereof; a casing secured to one side of said wall; a sleeve rotatably mounted within said casing and having a peripherally arranged ratchet wheel; a pawl non-rotatably but axially slidably mounted within said sleeve, said pawl cooperating with the ratchet wheel of said drum; an axially extending member having shouldered engagement with said pawl; an operating lever on the side of the wall adjacent said casing, said operating lever having a pawl cooperable with the ratchet wheel of said sleeve; an operating lever on the opposite side of the wall; and a release lever pivotally mounted on each of the operating levers, each release lever being adapted to engage and axially move said member having shouldered engagement with the first named pawl.

7. In a hand brake operable from both sides of a wall, the combination with a casing secured to one side of the wall; of a sleeve rotatably mounted within said casing, said sleeve having a peripheral ratchet wheel; a locking dog cooperable with said ratchet wheel to prevent rotation thereof in an unwinding direction; a winding drum extending through the wall and rotatably mounted at one end with respect to said sleeve, said drum having a ratchet wheel at said end; a pawl axially movable but non-rotatably mounted with respect to said sleeve and cooperable with the drum ratchet wheel; spring means normally maintaining said pawl in engagement with the drum ratchet wheel; a sleeve extending axially through the drum and on which said pawl is mounted; a centrally disposed axle extending through the last named sleeve; an operating lever rigidly secured to each end of said axle; a pawl carried by the operating lever at that end adjacent the casing and cooperable with the ratchet wheel of the first named sleeve; and a release lever pivotally mounted on each operating lever, each release lever having cooperative engagement with the second named sleeve to effect axial movement of the latter and thereby disengage the first named pawl from the drum ratchet wheel.

In witness that I claim the foregoing I have hereunto subscribed my name this 10th day of Jan. 1921.

JOHN F. O'CONNOR.

Witnesses:
 CARRIE GAILING,
 UNA C. PERIN.